Nov. 29, 1960 S. K. LACKOFF 2,962,584

IMPROVEMENTS IN OR RELATING TO SWITCHING DEVICES FOR SIGNAL TRANSCEIVERS

Filed March 7, 1957

INVENTOR.
SAMUEL K. LACKOFF

BY Theodor Hafner

ATTORNEY

United States Patent Office 2,962,584
Patented Nov. 29, 1960

2,962,584

IMPROVEMENTS IN OR RELATING TO SWITCHING DEVICES FOR SIGNAL TRANSCEIVERS

Samuel K. Lackoff, Manchester, N.H., assignor, by mesne assignments, to Van Norman Industries, Inc., New York, N.Y.

Filed Mar. 7, 1957, Ser. No. 644,630

6 Claims. (Cl. 250—13)

This invention relates to switching devices and more particularly to devices permitting the switchover from a signal transmitter to a signal receiver, and conversely.

In the normal course of radio communications, particularly where receiving and transmitting is realized substantially at the same point or station, it has been common to use a change-over relay so that a common antenna may be switched from the transmitter equipment to the receiver equipment as required.

One of the objects of the invention is to produce switchover with a minimum of delay.

Another object of the invention is a substantially fully electronic switch permitting immediate transition in a signal transceiver, from signal transmission to reception and conversely.

A further object of the invention is a switching circuit including a current responsive branch coupled in series with transmitter equipment and a bi-directional current path arranged in shunt with respect to receiver equipment which under control of transmitter current causes short circuiting and thereby disabling the receiver equipment.

Still another object of the invention is to provide in series with transmitter equipment a current responsive impedance and in series with such impedance, a pair of oppositely directed uni-directional current paths connected across receiver equipment and permitting the transmitter current upon an increase of impedance to increase the current passing through such uni-directional paths and to short circuit such receiver equipment.

A more specific object of the invention is to provide in series with a transceiver antenna a resistance increasing with heat and current passage, and in series with such resistance a pair of parallel opposite current paths connected across the receiver terminals and permitting increase of current passage through it with decrease of current passage through the resistance, thereby short circuiting the receiver terminals.

These and other objects of the invention will be more fully understood from the drawings annexed herewith in which Fig. 1 represents a circuit diagram of an electronic switch embodying certain features of the invention.

In the following, there is described a practically fully electronic device which eliminates or at least reduces to a minimum, electro-mechanical relaying and the time delays which may be encountered in such relaying.

In normal audio modulation or frequency modulation communication systems providing for transmission as well as reception, the operator first speaks and then listens. In such systems, normally, the use of an electro-mechanical relay is not objectionable because usually the operator presses a button or a switch during the transmission period. With the development, however, of single side-band or synchronous audio modulation systems, the operator speaks and listens substantially at the same time, in the same manner as if he were conversing over a standard land line telephone.

For these reasons, the time delay normally encountered in the use of electro-mechanical relays has been found objectionable.

Figures 1, 2:
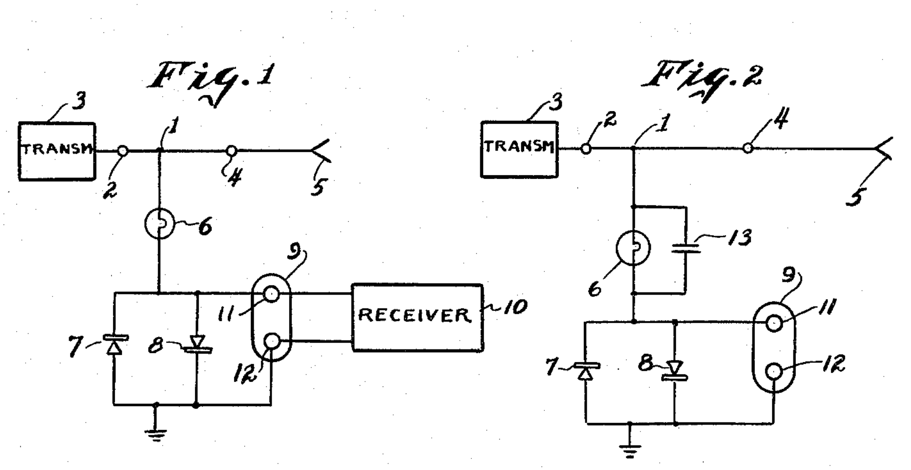
Fig. 2 illustrates a modification of Fig. 1.

More specifically, Fig. 1 illustrates a transmit-receive switch operating substantially instantaneously and automatically as far as voice communication is concerned.

In Fig. 1, part 1 represents a bar or wire lead connected from terminal 2 of transmitter 3 to terminal 4 of transmitting antenna 5. Connected to wire 1 is a thermistor or incandescent lamp 6 or like element having a high positive temperature co-efficient of resistance which is further connected to ground through a pair of semi-conductors or diodes 7, 8 which are connected in parallel with their polarities opposed.

Connector 9 of receiver 10 has one terminal, 11, connected to antenna terminal 4, and another terminal, 12, connected to ground.

The device operates in the following manner:

When transmitter 3 is not operating, semiconductors or diodes 7, 8 are not conducting and receiver antenna terminal 11 is directly connected to antenna 5 through the relatively low resistance of thermistor 6. When transmitter 3, however, is in operation, thermistor or lamp 6 will absorb at least some of the transmitter power, and thereby become rapidly a relatively very high resistance. It provides a low impedance path for the low level receiver signal and provides a high impedance to the high power transmitter signal, in order to prevent shorting large amounts of transmitter power to ground.

Simultaneously, semiconductors 7, 8 will conduct very heavily, thereby effectively short circuiting receiver antenna terminals 11, 12 so that the voltage present at receiver antenna terminal 11 will be negligible.

Fig. 2 illustrates basically the same circuit as that of Fig. 1, with the exception of capacitor 13 forming a by-pass for the reactive effects of thermistor 6 so that the switch may operate on a higher frequency.

Figure 3:
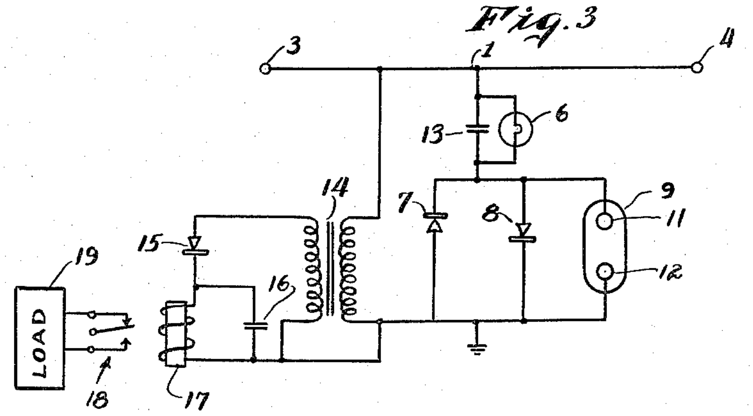
Fig. 3 illustrates a combination of an electronic switch with an electro-mechanical switch.

The version of a switch according to the invention as illustrated in Fig. 3, includes a wide band transformer 14 and an additional semiconductor or diode 15, a radio frequency bypass condenser 16 and a direct current relay 17 with switching contacts 18.

This type of switch operates in the following manner:

During the transmission period the radio frequency voltage is rectified causing relay 17, when energized, to change its contact arrangement 18 so that external equipment or equipment within the transceiver, as schematically indicated at 19, will be controlled by the transmission.

Figure 4:
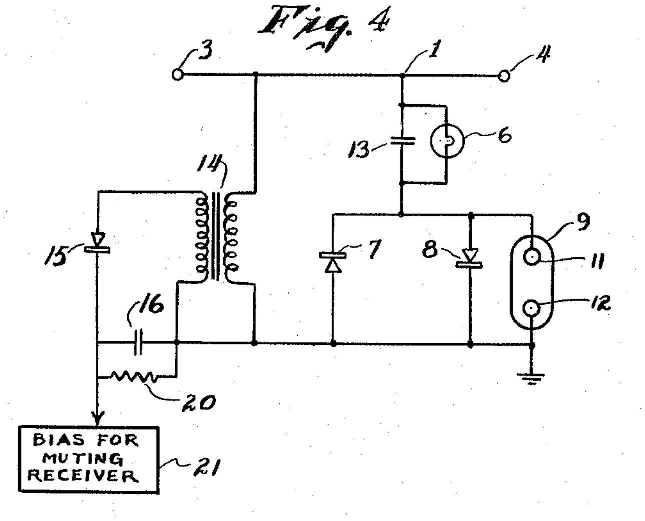
Fig. 4 illustrates a modification of Fig. 3.

Fig. 4 shows a similar version of a switch according to the invention, with the exception that a bias voltage is produced during the transmission period along a resistance 20. The polarity of this bias voltage will depend entirely on the polarity of semiconductor 15. This bias voltage can be used, among other things, for muting or disabling the receiver or part thereof; for example, the audio circuit of a receiver during the transmission period, as schematically indicated at 21.

In actual practice the transmit-receive switch herein described has been found to have only a negligible insertion loss for either transmitter or receiver.

Furthermore, a switch according to the invention has the further advantage of limiting the applied voltage to the receiver antenna terminals from other transmitters which may be in close proximity.

The semiconductors or diodes described above may be replaced by triodes or other multi-electrode vacuum tubes, or semiconductor elements; the electro-mechanical relay used in Fig. 3 may be replaced by electronic relays such as flip flop circuits; all this without exceeding the scope of this invention.

Nor is the invention limited to the circuits, circuit elements and circuit connections illustrated and described, but may be applied in any shape, form or manner whatsoever without departing from the scope of this disclosure.

I claim:

1. In a switching arrangement, a transmitter having an output and a receiver having an input, a current responsive element having a high negative temperature coefficient of attenuation and coupled at one end to the transmitter output, and a pair of parallel oppositely directed unidirectional current paths, both said current paths being connected at one of their ends simultaneously to the receiver input and the other end of said element, and said current paths being connected at their other ends to ground, so as to effectively short circuit said receiver input upon said element increasing in attenuation with increasing current and temperature.

2. A switching arrangement according to claim 1 comprising a capacitance in shunt with said element.

3. A switching arrangement according to claim 1 comprising a transformer having a primary coupled in shunt across the connection of element and uni-directional paths, and a secondary coupled in shunt across another connection of further uni-directional means and capacitance means, and control means coupled across said capacitance means, said control means including means coupled to said receiver for muting said receiver under control of said first series connection.

4. A switching arrangement according to claim 1 comprising a transformer having a primary coupled in shunt across the connection of element and uni-directional paths, and a secondary coupled in shunt across another connection of further uni-directional means and capacitance means, and control means including electro-mechanical relay means coupled across said capacitance means for muting said receiver.

5. A switching arrangement according to claim 1 comprising a transformer having a primary coupled in shunt across the connection of element and uni-directional paths, and a secondary coupled in shunt across another connection of further uni-directional means and capacitance means, and control means coupled across said capacitance means and including resistance means, means for deriving a biasing voltage from said resistance means, and means for applying said biasing voltage to said receiver for muting said receiver.

6. A switching arrangement according to claim 1 comprising a transformer having a primary coupled in shunt across the connection of element and uni-directional paths, and a secondary coupled in shunt across another connection of further uni-directional means and capacitance means, and control means coupled across said capacitance means and including resistance means, means for deriving a biasing voltage from said resistance means, and means for applying said biasing voltage to said receiver for muting said receiver, said receiver including an audio circuit to which said biasing voltage is applied.

References Cited in the file of this patent

UNITED STATES PATENTS

| | | |
|---|---|---|
| 2,277,731 | Toth | Mar. 31, 1942 |
| 2,654,834 | Zarky | Oct. 6, 1953 |
| 2,691,775 | Marcum | Oct. 12, 1954 |
| 2,807,713 | Kandoian | Sept. 24, 1957 |
| 2,835,867 | Golden | May 20, 1958 |

FOREIGN PATENTS

| | | |
|---|---|---|
| 733,781 | Germany | Apr. 2, 1943 |

OTHER REFERENCES

International Dictionary of Physics and Electronics, Van Nostrand Co., 1956, page 901.